Oct. 3, 1967 — J. W. E. HANES ET AL — 3,345,084
PIPE TOOL JOINTS

Filed Feb. 8, 1965 — 2 Sheets-Sheet 1

INVENTORS.
JAMES W. E. HANES
JOE H. HYNES

By Bernard Kriegel
ATTORNEY.

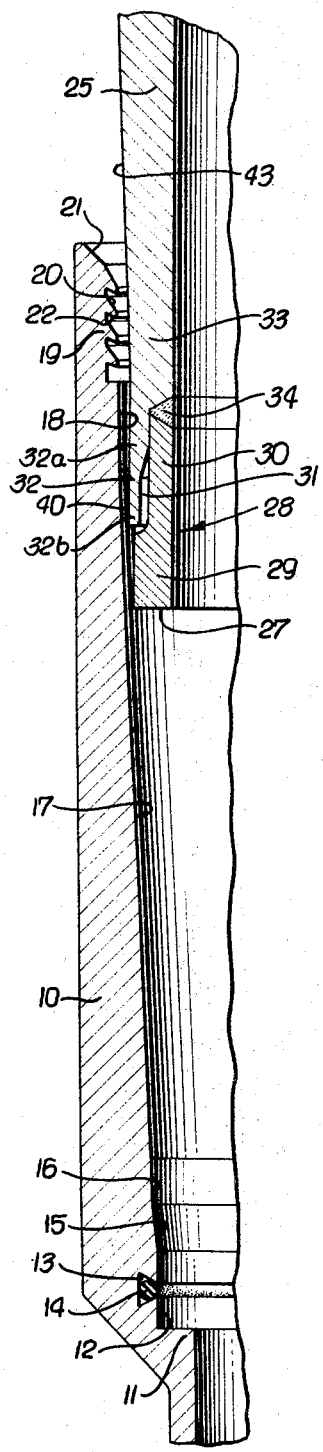
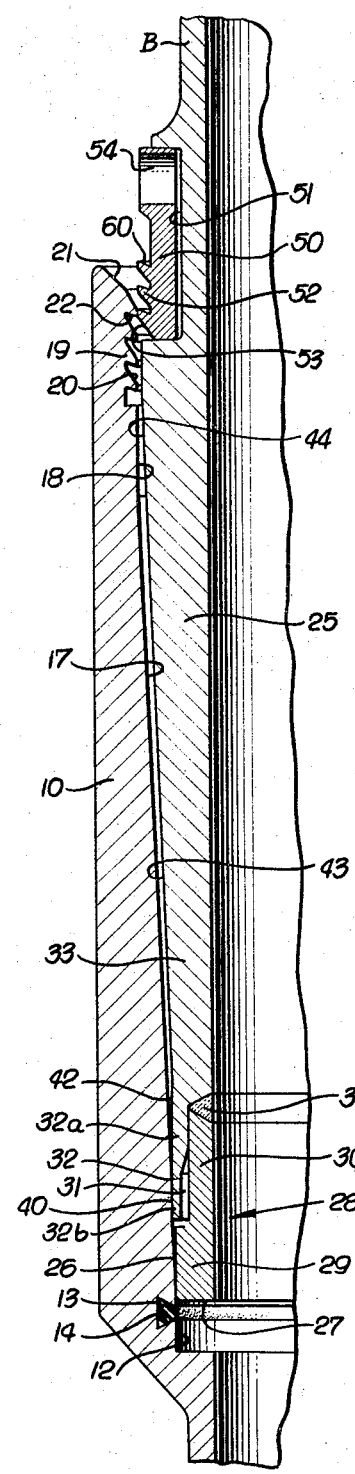
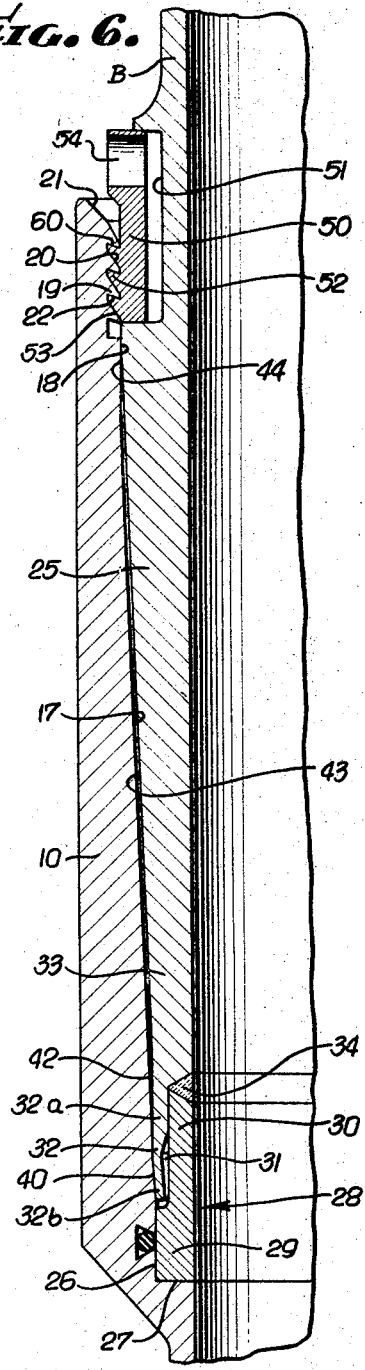
Inventors.
James W. E. Hanes
Joe H. Hynes
By Bernard Kriegel
Attorney.

United States Patent Office 3,345,084
Patented Oct. 3, 1967

3,345,084
PIPE TOOL JOINTS
James W. E. Hanes and Joe H. Hynes, Ventura, Calif.,
assignors, by mesne assignments, to Ventura Tool Company, Ventura, Calif., a corporation of California
Filed Feb. 8, 1965, Ser. No. 430,816
9 Claims. (Cl. 285—27)

The present invention relates to tool joints for connecting pipe sections together.

Difficulty has been encountered in connecting sections of pipe together as it is lowered from a floating vessel toward and into a subsea well bore. Heretofore, the pipe sections have either been secured to one another by the use of threaded joints or by welding. The pitch and roll of the floating vessel makes the proper stabbing of one of the joint members into the other and their interconnection difficult, and, at times, almost impossible of accomplishment. As a result, much time is consumed in making up the joints. In view of the high unit cost of operating floating drilling vessels, the total monetary cost of making up tool joints becomes prohibitive.

An object of the present invention is to provide a tool joint or connector that enables a coupling connection to be made by stabbing one of the joint members into its companion member without requiring relative rotation between the members, insertion or stabbing occurring readily despite initial disalignment between the members, the connector members, when coupled together, having a metal-to-metal seal to prevent leakage therebetween.

Another object of the invention is to provide a tool joint or connector that enables the joint members to be threadedly coupled to one another without relatively rotating them, merely by stabbing one member into the other, and in which uncoupling can be obtained without the requirement for their relative rotation.

A further object of the invention is to provide a tool joint or connector in which a coupling connection can be made by stabbing one of the joint members into its companion joint member and without their relative rotation, a metal-to-metal seal being provided between the members, the members being positively coupled to each other through the agency of a threaded connection capable of being tightened to enhance the seal and to insure the coupling connection without requiring relative rotation between the members.

An additional object of the invention is to provide a tool joint or connector of the character above indicated, in which the metal-to-metal seal is protected against damage as a result of normal handling, and against contamination by fluid or fluid-like substances passing through the joint.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
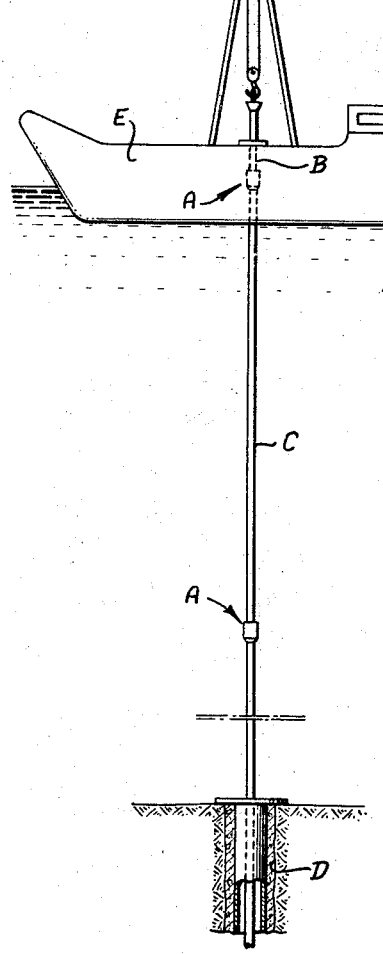
FIGURE 1 is a diagrammatic view disclosing the invention in connection with a subsea well bore.

FIGS. 4, 5, and 6 are partial longitudinal sections, on an enlarged scale, illustrating different relative positions of the tool joint or connector in effecting their interconnection.

The tool joint or connector A illustrated in the drawings finds particular application in connecting sections B, C of marine conductors, and similar pipe together, which are to be lowered toward and into a subsea well bore D from a floating vessel E. Proper alignment between the upper and lower pipe sections B, C have been difficult of attainment because of the roll and pitch of the vessel. The lower pipe section C is usually supported in the slips (not shown) in the rotary table (not shown), and the upper pipe section B can swing to a substantial extent before the connection is made as a result of vessel movement.

The lower pipe section C terminates in an upper box member 10 of the tool joint, which has a lower internal shoulder 11 from which extends an inner cylinder wall or surface 12 which has an internal circumferential groove 13 opening thereinto adapted to contain a seal ring 14, such as a rubber or rubber-like O-ring. The upper end of this cylindrical wall or surface 12 merges into the lower end of a downwardly tapering seal surface 15, the angle of taper being comparatively steep, as, for example, of the order of 4 degrees to 5 degrees to the axis of the box member. The upper end of this tapered surface 15 merges into the lower end of an intermediate inner cylindrical wall or surface 16 of the box 10, the upper end of which merges into the lower end of a downwardly tapering elongate inner wall or section 17 extending to the upper portion of the box, where it merges into an upper inner cylindrical wall or section 18. Immediately above such upper inner cylindrical wall, the box member is provided with a buttress thread section 19, one face 20 of each thread turn tapering downwardly, as shown in the drawings, or away from the tapered or flaring mouth 21 of the box, and the other face 22 of each thread making a negative angle, that is, being undercut so that it is inclined toward the axis of the box in a direction away from its outwardly flaring mouth 21.

The upper pipe section B terminates in a lower pin member 25 of the tool joint or connector, which is adapted to fit within the box member 10. The internal diameter of the pin is substantially the same as the internal diameter of the box member below its shoulder 11. The pin 25 has a lower external cylindrical surface 26 adapted to fit snugly within the inner surface 12 of the box when the end or terminal 27 of the pin engages or is closely adjacent to the shoulder 11, so that the seal ring 14 sealingly engages the external surface 26 and prevents fluid leakage between the pin and box members.

The pin member is actually composed of two main parts. Thus, it comprises a lower section 28 having the lower seal head portion 29 with the outer cylindrical wall 26 adapted to be sealingly engaged by the seal ring 14, and this section has an upper portion 30 of reduced external diameter which provides a recess 31 into which a lower sealing skirt portion 32 of the upper pin section 33 extends, the upper portion 30 of the lower section fitting within the skirt and being integrated to the upper section by welding material 34 extending around the interior of the pin member. The upper portion 32a of the sealing skirt snugly engages the periphery of the upper portion 30 of the lower section, but the lower portion 32b of the sealing skirt has an internal diameter less than the external diameter of the upper portion 30 of the lower section, there being an annular clearance space between the skirt 32b and upper portion 30 to allow inward deflection of the sealing skirt. The lower end of the sealing skirt 32 is free from engagement with the head 29 of the lower section, being spaced axially therefrom so that the skirt can deflect laterally.

The lower portion 32b of the skirt has a tapered periphery 40 which is more steeply tapered than the angle of taper of the box surface 15 so that the inward movement of the pin 25 within the box 10 to final position will cause the tapered surfaces 15, 40 to have an interference fit, the greater angle of taper of the box surface 15 deflecting the skirt laterally inwardly to a slight extent, providing assurance that a circumferentially continuous metal-to-metal seal is secured between the skirt and the tapered wall of the box. As an example, the metal seal element or skirt 32b may have a taper of 3°45′, whereas the companion internal seal surface 15 of the box may have a taper of 4°35′, causing the above referred to interference and inward deflection of the skirt as the pin moves axially within the box to its fullest extent.

The upper portion 32a of the skirt and the adjacent main body of the upper pin section 33 have an intermediate outer cylindrical wall or surface 42 companion to the intermediate inner cylindrical wall or surface 16 and adapted to be disposed therein when the pin terminal 27 engages or is closely adjacent to the shoulder 11. The upper end of this intermediate outer cylindrical surface 42 merges into the lower end of an external tapered peripheral surface 43 which is companion to the inner tapered wall or section 17 of the box, the upper end of the tapered periphery 43 merging into the lower end of an upper outer cylindrical surface or section 44 on the pin companion to the upper inner cylindrical wall or section 18 of the box. Engagement of the lower end of the cylindrical surface 42 with the upper end of the tapered wall 15 will limit the extent to which the skirt 32b can be deflected inwardly.

The pin carries a split externally threaded spring-like lock ring 50 disposed in a companion peripheral groove 51 in the outer portion of the pin member 25, the radial depth of the groove being substantially greater than the radial thickness of the ring so that the latter can shift laterally. The ring has a normal, unconfined diameter slightly greater than the root diameter of the box threads 19, and when contracted the ring will inherently tend to expand from its contracted condition. The upper and lower ends of the ring 50 are slidable along the companion upper and lower sides of the coupling ring groove 51, the ring and ring groove projecting partially out of the box 10 when the pin terminal 27 is in juxtaposition to the box shoulder 11. The inner or lower portion of the split lock ring has external buttress threads 52 companion to the internal box threads 19 and are adapted to fully mesh therewith when the pin terminal 27 is adjacent to or engages the box shoulder.

As the pin 25 moves relatively into the box 10, the tapered faces 53 of the coupling ring thread 52 will engage the tapered or flaring mouth 21 of the box, as well as the companion tapered sides 20 of the box thread 19, which will cam or deflect the split lock ring 50 inwardly, the lock ring thread 52 ratcheting freely past the box thread 19 upon substantially full insertion of the pin in the box. The lock ring then inherently expands, to bring its thread 52 into full threaded mesh with the internal box thread 19. Prior to insertion of the pin within the box, the lock ring 50 occupies its normal or initial position within the coupling ring groove 51, being partially retained therein, the ring being incapable of coming out of its groove inadvertently.

The outer portion of the lock ring 50, which is in an exposed position beyond the mouth 21 of the box 10, has suitable means 54 thereon which are adapted to be engaged by a suitable tool (not shown) in order to turn the ring 50 within its groove 51 after the external and internal threads 52, 19 are enmeshed, in order to further thread the ring into the box, which will force the pin 25 fully downwardly within the box 10 and insure the snug and tight coengagement between the sealing skirt 32b and the companion tapered surface 15 in the box.

Figure 2:
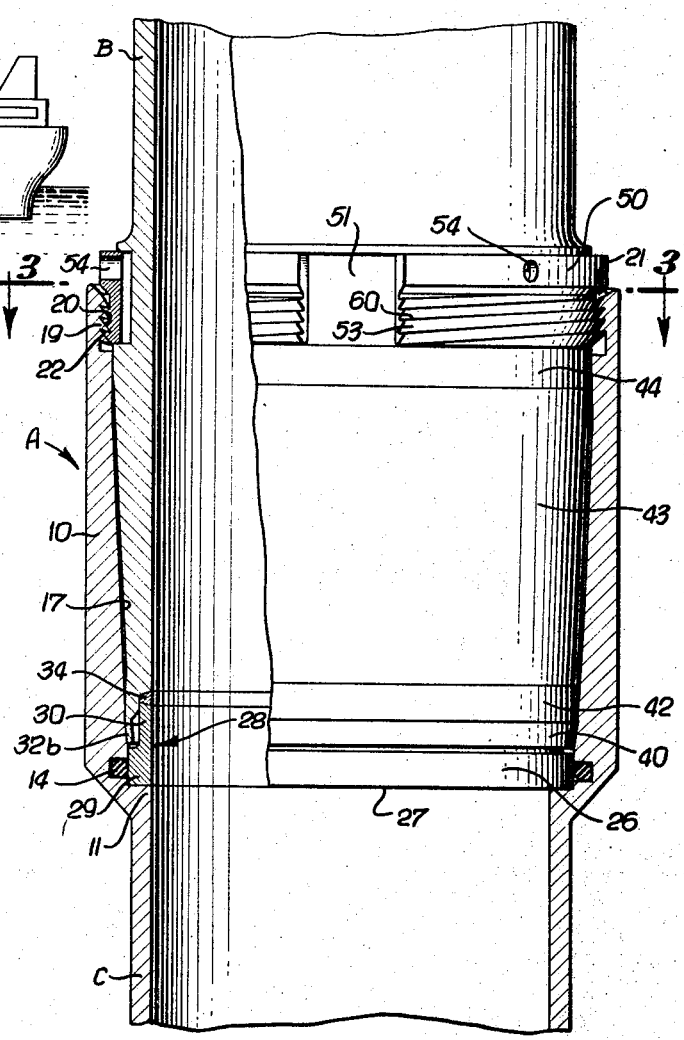
FIG. 2 is an enlarged section through the tool joint, a portion being shown in elevation.
Figure 3:
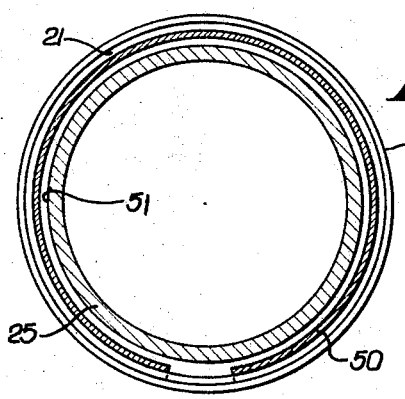
FIG. 3 is a section taken along the line 3—3 on FIG. 2.

In making up a connection between adjacent pipe sections, such as the sections B, C, the elastic seal ring 14 is disposed in the box groove 13 and the threaded lock ring 50 is mounted in the pin groove 51. The upper pipe section B is moved downwardly toward the lower pipe section C and the pin portion 25 stabbed into the box portion 10. In the event of misalignment between the pipe sections, the lower portion of the pin can enter the upper portion of the box readily which is of substantially greater internal diameter, and the upper pipe section B then lowered, causing the pin to engage the tapered wall 17 of the box (FIG. 4), which will bring the pin into alignment with the box 10 as the pin moves longitudinally within the latter (FIG. 5). As the lower portion 29 of the pin moves into the companion lower inner cylindrical wall or surface 12 of the box, the lock ring 50 shifts into the threaded box portion 19, the ring ratcheting over the thread 19 until it is substantially fully inserted within the latter. At this time, the inner, intermediate and outer cylindrical surfaces 44, 42, 26 of the pin are disposed within their companion outer, intermediate and inner cylindrical walls or surfaces 18, 16, 12 of the box, the peripherally tapered portion 43 of the pin confronting the inner tapered wall 17 of the box, and the sealing skirt 32b of the pin being engaged with the companion tapered surface 15 of the box (FIGS. 2, 6).

The placing of the pin 25 within the box 10 occurs as a result of the straight-line and non-rotary motion between the pin and box, and yet a threaded connection is obtained between the pin and box, due to the presence of the split lock ring 50, which is rotatably mounted within the external pin groove 51. Firm tightening of the parts against one another is obtained by placing a suitable tool in one of the holes 54 in the outer portion of the lock ring and striking such tool with a hammer, or the like, to turn the ring partially in its groove 51, which will thread it longitudinally inwardly within the box thread 19 and move the pin inwardly to a further extent within the box. Such action will firmly couple the pin and box to one another, and will also insure the snug engagement of the deflectable skirt 32b with the inner tapered sealing wall 15 of the box. As the ring 50 is turned within the box, any tendency for the ring to be shifted or collapsed inwardly is prevented by the negative angle of contact between the external ring thread surface 60 and the internal box thread surface 22, which provides a force component on the split ring directed laterally outwardly.

It is to be noted that the box member and pin member overlap one another along a sufficient length as to create a stiff, stable structure capable of resisting substantial bending loads. The parts are held snugly in alignment with one another by virtue of the coengagement between the external and internal cylindrical surfaces. It is further to be noted that the tapered sealing surface 15 is inside the box and is not subject to damage in handling. Similarly, the metal sealing element or skirt 32b is not subject to damage in normal handling because of the fact that it is located within a recess 31 in the pin member, and does not project laterally outwardly of its periphery, except due to a very small extent arising from the fact of its tapered shape. The metal-to-metal seal 15, 32b is in such a location as to be protected by the pliant, elastic seal ring 14, which will preclude mud and other fluids passing through the joint from coming into contact with the metallic seal. Drilling mud and other foreign substances are precluded from entering or packing around the region of the metal-to-metal seal.

The members of the connector are readily coupled securely to one another in leakproof relation primarily by the act of merely stabbing the pin member 25 into the box member 10. Relative rotation between the pipe sections B, C and of the pin and box is unnecessary. It is only necessary to rotate the lock ring 50 to obtain firm securing of the pin and box to one another. For that matter, the lock ring 50 can be rotated in a reverse direction to threadedly disengage it from the box, allowing straight-line removal of the pin 25 from the box 10 and disconnection between the pipe sections B, C.

We claim:

1. In a tool joint: a box member having an inner circumferential tapered sealing surface; a pin member receivable in said box member and having a deflectable circumferential tapered skirt formed as a cantilever member, the free end portion of said skirt being located longitudinally inwardly of an end portion of said pin member and engageable with said tapered sealing surface to be forced laterally inwardly thereby and provide a circumferential seal between a tapered external periphery of said skirt and said sealing surface; said end portion of said pin member being axially separated from and extending transversely across at least a portion of said skirt to protect said skirt; and means for securing said members to one another to maintain said circumferential seal.

2. In a tool joint as defined in claim 1; wherein the angle of taper of said external periphery to the axis of said pin portion prior to engagement of said tapered skirt with said tapered sealing surface is less than the angle of taper of said tapered sealing surface.

3. In a tool joint; a box member having a cylindrical surface at its inner section and a tapered sealing surface between said cylindrical surface and the outer end section of said box member; a pin member receivable in said box member and having a cylindrical peripheral portion at its outer end section conforming to said cylindrical surface and a deflectable circumferential tapered skirt formed as a cantilever member, the free end portion of said skirt being located longitudinally inwardly of an end portion of said pin member and engageable with said tapered sealing surface when said peripheral portion is within said cylindrical surface to be forced laterally inwardly by said tapered surface, and to provide a circumferential seal between a tapered external peripheral surface of said skirt and said sealing surface; said end portion of said pin member being axially separated from and extending transversely across at least a portion of said skirt to protect said skirt; said box member having an inner circumferential groove opening inwardly of said cylindrical surface and disposed between and spaced from the ends of said cylindrical surface; a seal ring in said groove engageable with said cylindrical peripheral portion; and means for securing said members to one another to maintain said circumferential seal and to retain said seal ring engaged with said peripheral portion.

4. In a tool joint: a box member having a cylindrical surface at its inner section and a tapered sealing surface between said cylindrical surface and the outer end section of said box member; a pin member receivable in said box member and having a cylindrical peripheral portion at its outer end section conforming to said cylindrical surface and a deflectable circumferential tapered skirt engageable with said tapered sealing surface when said peripheral portion is within said cylindrical surface, said skirt being forced laterally inwardly by said tapered surface to provide a circumferential seal between a tapered external periphery of said skirt and said sealing surface; the angle of taper of said external skirt periphery to the axis of said pin portion prior to engagement of said skirt with said tapered sealing surface being less than the angle of taper of said tapered sealing surface; said box member having an inner circumferential groove opening inwardly of said cylindrical surface; a seal ring in said groove engageable with said cylindrical peripheral portion; and means for securing said members to one another to maintain said circumferential seal and to retain said seal ring engaged with said cylindrical portion.

5. In a tool joint: a box member having a first inner cylindrical surface at its inner section, a second inner cylindrical surface at its outer end section, a third inner tapered surface tapering from said second inner surface toward said first inner surface, and a fourth tapered sealing surface between said third tapered surface and said first cylindrical surface; a pin member receivable in said box member; said pin member having a first cylindrical peripheral surface at its outer end section conforming to said first inner cylindrical surface, a second cylindrical peripheral surface adjacent to its other end section conforming to said second inner surface, a third peripheral tapered surface conforming to said third inner tapered surface, and a deflectable circumferential portion between said tapered peripheral surface and first cylindrical peripheral surface and engageable with said fourth tapered sealing surface to be forced laterally inwardly thereby and provide a circumferential seal between a tapered external periphery of said circumferential portion and said fourth tapered sealing surface; and means for securing said members to one another to maintain said circumferential seal and to retain said first, second and third peripheral surfaces within their companion first, second and third inner surfaces.

6. In a tool joint: a box member having a first inner cylindrical surface at its inner section, a second inner cylindrical surface at its outer end section, a third inner tapered surface tapering from said second inner surface toward said first inner surface, and a fourth tapered sealing surface between said third tapered surface and said first cylindrical surface; a pin member receivable in said box member; said pin member having a first cylindrical peripheral surface at its outer end section conforming to said first inner cylindrical surface, a second cylindrical peripheral surface adjacent to its other end section conforming to said second inner surface, a third peripheral tapered surface conforming to said third inner tapered surface, and a deflectable circumferential skirt engageable with said tapered sealing surface to be forced laterally inwardly thereby and provide a circumferential seal between said skirt and said sealing surface; the angle of taper of said skirt periphery to the axis of said pin portion prior to engagement of said skirt with said tapered sealing surface being less than the angle of taper of said tapered sealing surface; and means for securing said members to one another to maintain said circumferential seal and to retain said first, second and third peripheral surfaces within their companion first, second and third inner surfaces.

7. In a tool joint: a box member having an inner circumferential tapered sealing surface; a pin member receivable in said box member and having adjacent its end a deflectable circumferential portion engageable with said tapered sealing surface to be forced laterally inwardly thereby and provide a circumferential seal between a tapered external periphery of said circumferential portion and said sealing surface; said box member having internal threads at its outer end; said pin member having a peripheral groove; a laterally expandable and contractable lock ring rotatable in said groove but retained against axial movement by the sides of said groove and having an external thread meshable with said internal thread, the depth of said groove and the radial thickness of said ring being such that engagement of said ring will contract laterally in said groove to nonmeshing relation to said internal thread to thereby enable longitudinal and non-rotary insertion of said pin member in said box member, after which said ring expands in said groove to mesh its threads with said internal thread to secure said members to one another to maintain said circumferential seal; said ring having means thereon for enabling said ring to be rotated on said pin member with its thread in mesh with said internal thread whereby to force said pin member more fully within said box member.

8. In a tool joint: a box member having a cylindrical surface at its inner section and a tapered sealing surface between said cylindrical surface and the outer end section of said box member; a pin member receivable in said box member and having a cylindrical peripheral portion at its outer end section conforming to said cylindrical surface, said pin member having adjacent its end a deflectable circumferential portion engageable with said tapered sealing surface when said peripheral portion is within said cylindrical surface to be forced laterally inwardly by said tapered surface and to provide a circumferential seal between a tapered external peripheral surface of said circumferential portion and said sealing surface; said box member having an inner circumferential groove opening inwardly of said cylindrical surface and disposed between and spaced from the ends of said cylindrical surface; a seal ring in said groove engageable with said cylindrical peripheral portion; said box member having an internal buttress thread at its outer end; said pin member having a peripheral groove; a laterally expandable and contractable lock ring rotatable in said groove but retained against axial movement by the sides of said groove and having an external buttress thread meshable with said internal thread, the depth of said groove and the radial thickness of said ring being such that engagement of the leading faces of said buttress threads with each other upon relative insertion of said pin member in said box member shifts said ring laterally on said pin member to non-meshing relation to said internal thread and thereby allows said ring to move without rotation longitudinally along said internal thread, after which said ring shifts laterally to mesh its external thread with said internal thread; said ring having means thereon for enabling said ring to be rotated on said pin member with its external thread in mesh with said internal thread to urge said pin member axially within said box member.

9. In a tool joint: a box member having a cylindrical surface at its inner section and a tapered sealing surface between said cylindrical surface and the outer end section of said box member; a pin member receivable in said box member and having a cylindrical peripheral portion at its outer end section conforming to said cylindrical surface and a deflectable circumferential skirt engageable with said tapered sealing surface when said peripheral portion is within said cylindrical surface to be forced laterally inwardly by said tapered sealing surface and to provide a circumferential seal between a tapered external periphery of said skirt and said sealing surface; said box member having an inner circumferential groove opening inwardly of said cylindrical surface; a seal ring in said groove engageable with said cylindrical peripheral portion; said box member having an internal buttress thread; said pin member having a peripheral groove; a laterally expandable and contractable lock ring in said groove rotatable on said pin member and having an external buttress thread meshable with said internal thread, the leading faces of said buttress threads being engageable with each other upon relative insertion of said pin member in said box member to shift said ring laterally on said pin member to non-meshing relation to said internal thread and allow said ring to move without rotation longitudinally along said internal thread after which said ring shifts laterally to mesh its external thread with said internal thread; said ring having means thereon for enabling said ring to be rotated on said pin member with its external thread in mesh with said internal thread to urge said pin member axially within said box member; the angle of taper of said external periphery of said skirt to the axis of said pin portion prior to engagement of said skirt with said tapered sealing surface being less than the angle of taper of said tapered sealing surface; said internal and external buttress threads having undercut trailing faces engageable with each other to hold said ring laterally outwardly with its external thread meshed with said internal thread.

References Cited

UNITED STATES PATENTS

| 2,239,942 | 4/1941 | Stone et al. | 285—110 |
| 2,746,486 | 5/1956 | Gratzmuller | 285—334.4 X |
| 2,849,245 | 8/1958 | Baker | 285—141 |
| 2,992,019 | 7/1961 | MacArthur | 285—334.4 X |
| 3,092,404 | 6/1963 | MacWilliam | 285—334.4 |
| 3,168,333 | 2/1965 | Dziura | 285—35 |

FOREIGN PATENTS

| 872,079 | 1/1942 | France. |
| 1,012,498 | 7/1957 | Germany. |
| 942,790 | 11/1963 | Great Britain. |

CARL W. TOMLIN, *Primary Examiner.*

R. G. BERKLEY, *Assistant Examiner.*